United States Patent
Cyr

[19]

[11] Patent Number: 5,870,294
[45] Date of Patent: Feb. 9, 1999

[54] SOFT SWITCHED PWM AC TO DC CONVERTER WITH GATE ARRAY LOGIC CONTROL

[75] Inventor: Jean-Marc Cyr, Lachine, Canada

[73] Assignee: Northern Telecom Limited, Montreal, Canada

[21] Appl. No.: 939,103

[22] Filed: Sep. 26, 1997

[51] Int. Cl.⁶ .................................................. H02M 1/12
[52] U.S. Cl. .............................. 363/41; 363/95; 323/222
[58] Field of Search ............................... 363/41, 65, 95; 323/222

[56] References Cited

U.S. PATENT DOCUMENTS

| | | | |
|---|---|---|---|
| 4,742,441 | 5/1988 | Akerson | 363/97 |
| 5,060,130 | 10/1991 | Steigerwald | 363/65 |
| 5,363,020 | 11/1994 | Chen et al. | 315/209 R |
| 5,408,402 | 4/1995 | Nonnenmacher | 363/21 |
| 5,442,540 | 8/1995 | Hua et al. | 363/98 |
| 5,461,301 | 10/1995 | Truong | 323/222 |
| 5,568,041 | 10/1996 | Hesterman | 323/222 |
| 5,612,858 | 3/1997 | Weinmeier et al. | 363/21 |
| 5,617,013 | 4/1997 | Cozzi | 323/222 |
| 5,631,816 | 5/1997 | Brakus | 363/97 |
| 5,638,265 | 6/1997 | Gabor | 363/89 |
| 5,729,449 | 3/1998 | Takada et al. | 363/41 |

*Primary Examiner*—Stuart N. Hecker
*Attorney, Agent, or Firm*—Swabey, Ogilvy, Renault

[57] ABSTRACT

A soft switched PWM AC to DC power converter for a DC power supply is disclosed. The power supply includes a power factor corrector (PFC) converter with a power boost topology, a DC/DC converter with a forward topology and a fly-back converter which serves as an auxiliary power supply for the controller components. The three converters are synchronized by a gate array logic (GAL) IC to minimize EMI noise. The GAL also conditions the PWM for the PFC and the DC/DC converter to provide very precise switching control. Synchronizing and PWM timing signals are derived by the GAL using a high-speed clock signal that is input to the GAL as a data input. The clock signal is repeatedly divided using synchronous division to yield a digital monostable timing signal that enables very precise control of converter switches.

12 Claims, 2 Drawing Sheets

SOFT SWITCHED PWM AC TO DC CONVERTER WITH GATE ARRAY LOGIC CONTROL

RELATED APPLICATIONS

This application is related to an application entitled CONTROLLER SYSTEM FOR A DC POWER SUPPLY filed 25 Sep. 1997.

TECHNICAL FIELD

The present invention relates generally to power supplies, and more particularly, to a high-efficiency pulse-width-modulated AC to DC power converter for use in a DC power supply system for telecommunications equipment.

BACKGROUND OF THE INVENTION

It is generally recognized that there are benefits to be realized by operating pulse-width-modulated (PWM) converters at high frequencies. High-frequency operation permits lower cost and lighter weight converters to be constructed. Soft switching permits even higher switching frequencies. In order to successfully realize a PWM that operates at high frequencies, however, it is necessary to achieve very precise control of the PWM switches and to precisely synchronize the different converters used in the power supply. While many designs for such power supplies have been invented, to date a design which enables PWM control and converter synchronization precise enough for an efficient and robust power supply has not been developed.

SUMMARY OF THE INVENTION

It is an object of the invention to provide an AC to DC power converter which uses a gate array logic integrated circuit to time and condition PWM signals for driving converters used in a power supply in order to achieve soft switching which minimizes component stresses.

It is another object of the invention to provide an AC to DC converter which uses a gate array logic for providing converter synchronization signals reduce electron-magnetic induction (EMI).

It is a further object of the invention to provide an improved soft switched power supply which uses power boost and forward DC/DC converter topologies to provided stable DC output even when the voltage of the AC input fluctuates.

These and other objects of the invention are realized in a soft switched PWM AC to DC converter, comprising:
 a power factor corrector converter with a boost topology that operates at a first fixed frequency;
 a DC/DC converter with a forward topology that operates at a second fixed frequency;
 a clock that operates at a fixed frequency that is greater than the first fixed frequency and the second fixed frequency; and
 a gate array logic IC for timing and synchronizing PWM signals for the power factor corrector converter and the DC/DC converter using the clock signal, whereby the clock signal is divided "n" times in the gate array logic IC using a synchronous divider to provide digital timing signals for use in converter synchronization and gate signal soft switching.

The power supply in accordance with the invention incorporates three converters. The converters include a Power Factor Corrector (a boost topology) and a DC/DC converter (a forward topology). A fly-back converter serves as an auxiliary power supply for supplying operating current to the power supply control components. In order to achieve a high-quality stable DC output substantially free from noise and harmonics, it is necessary to exercise precise control over the PWM for switching those converters and to synchronize the operation of each converter to reduce EMI noise. To date, such control has not been realized because the logic required to exercise precise control is complex. The present invention overcomes this problem by using a gate array logic IC, available from Lattice Semiconductor Corp., Hillsboro, Oreg. U.S.A., and a unique method for controlling the PWM and synchronizing the converters.

In particular, a very high frequency clock signal is input to the gate array logic IC as a data signal as well as a clock signal. The data signal is divided using synchronous division to achieve a digital timing signal that may be described as a virtual monostable output which provides an extremely precise timing signal preferably having a cycle of $1/64$ of the total period resolution. The digital timing signal permits very precise synchronization of the three converters to minimize noise and harmonics. In addition, the gate array logic IC is used to throttle the DC/DC converter to a 50% duty cycle. This eliminates the requirement for a throttled PWM chip which permits the use of a more robust chip that generates considerably less noise and therefore ensures more precise PWM control.

The gate array logic IC is also used for analyzing operating conditions in order to provide finer power supply control. The gate array logic IC generates enabling signals to enable and disable the PWM for the Power Factor Corrector and the DC/DC converter based on outputs from a low-line sensor, a high-line sensor, a low-bulk sensor, a high-bulk sensor, a temporary release sensor and a high-voltage shutdown sensor. The high-line and low-line sensors detect input voltages which are outside the limits for which the power supply was designed. The high-bulk and low-bulk sensors indicate a problem at the Power Factor Corrector. The high-voltage shutdown indicates a problem at the load.

The invention therefore provides an efficient, robust, light-weight controller which is particularly useful for making power supplies for telecommunications applications.

BRIEF DESCRIPTION OF THE DRAWINGS

The invention will now be further explained by way of example only and with reference to the following drawings wherein.

DETAILED DESCRIPTION OF THE PREFERRED EMBODIMENT

Figure 1:
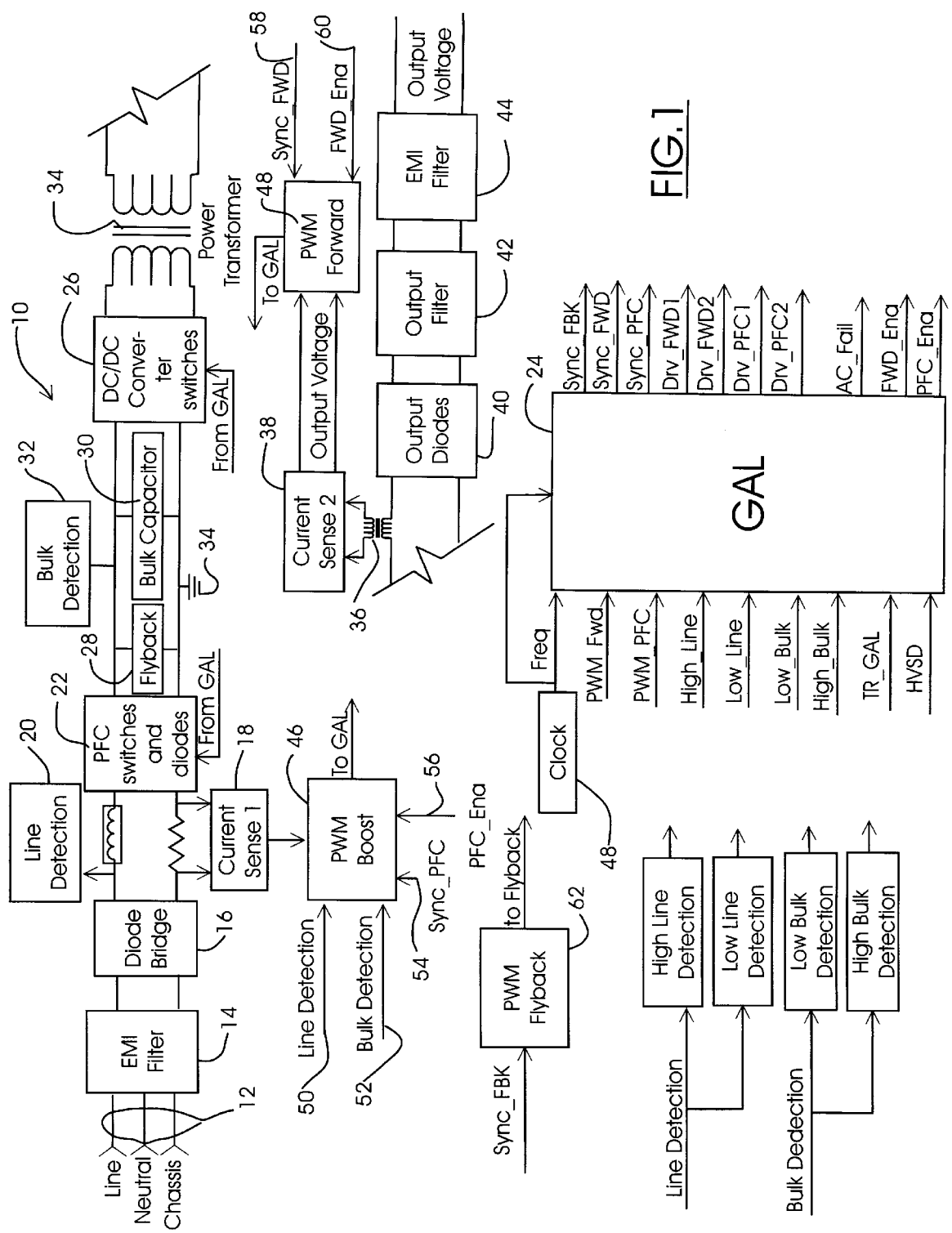
FIG. 1 is a schematic block diagram of a power supply in accordance with the invention.

FIG. 1 shows a schematic block diagram of a power supply in accordance with the invention. A detailed description of the components of the power supply are provided in a related application ENTITLED CONTROLLER SYSTEM FOR A DC POWER SUPPLY which is assigned to the applicant and was filed on 25 Sep. 1997. The specification of that application is hereby incorporated by reference in its entirety.

The power supply in accordance with the invention is generally indicated by the reference 10. An AC input 12 includes a line, neutral and chassis. The AC input passes through an electromagnetic interference (EMI) filter 14 and a rectifier (diode bridge) 16. A recitified input current is sensed by a first current sensor 18 in order to shape it and a voltage sensor to permit control of line bulk at the same time, as will be explained below. A first called a Power Factor Corrector (hereinafter PFC 22) with a boost topology well known in the art is indicated by reference 22. The PFC 22 is driven by conditioned drive signals output by a gate array logic IC (hereinafter referred to as GAL 24) as will be explained below in more detail. The output of the PFC 22 is input to a second converter having a forward topology, also well known in the art. The forward converter includes the DC/DC converter switches 26, a power transformer 34 and the output diodes 40. Positioned between the PFC 22 and the DC/DC converter switches 26 is a third converter, a fly-back converter 28 which is controlled by a fly-back PWM as will also be explained below in more detail. The fly-back converter 28 functions as an auxiliary power supply. It uses energy stored in the bulk capacitors 30 to output operating current to the control circuitry for the power supply 10. Located between the fly-back converter 28 and the DC/DC converter switches 26 is a bulk capacitor 30, a bulk-detection circuit 32 and a ground 34, the function of each of which is well understood in the art.

The DC/DC converter switches 26 are connected to a power transformer 34 to isolate input line from output load which is rectified by the output diodes 40 to give a desired DC output voltage, typically –48 volts for use in telecommunications applications. Connected to the line side of the power transformer 34 through a current transformer 36 is a second current sensor 38 which outputs current to the PWM chip for the DC/DC converter switches 26 as will likewise be explained below in more detail. The output of the forward converter passes through an output filter 42 and an EMI filter 44, each of which is also well understood in the art.

As explained above, the PFC 22, the DC/DC converter switches 26 and the fly-back converter 28 are each switched by a PWM signal generated by a respective PWM IC which outputs signals under the control of the GAL 24. The signals output by each PWM IC for the PFC 22 and the DC/DC converter switches 26 are conditioned by the GAL 24. The operation of all three converters is synchronized by signals also output by the GAL 24, as will be explained below in more detail. The PFC 22 is switched by a PWM boost IC 46. A gating signal is output by the PWM boost IC 46. The gating signal is stepped down by a voltage divider and fed into the GAL 24. The output from the PWM boost IC 46 is too coarse to be used to drive the PFC 22 directly. It is therefore conditioned by the GAL using frequencies derived from a high-speed clock 48 which preferably operates at a frequency of 6.4 MHz as will be explained below with reference to FIG. 2. The GAL 24 generates the necessary OFF time for the PWM's output signal using synchronization pulses generated from the clock frequency for the timing in the period of the natural resonant oscillation of the line current. The PFC 22 preferably operates at a fixed frequency of 400 KHz. The output of the PWM boost IC 46 is controlled by a line detection input 50 for current shaping, a bulk detection input 52 for bulk control, a synchronizing signal Sync_PFC 54 for EMI reduction output by the GAL 24 and an enable signal PFC_Ena 56 also put by GAL 24. The shape of the input current should be the same as the line voltage. The proper shape is a sine wave. The bulk detection input is to control the DC voltage across the bulk capacitors 30.

The DC/DC converter switches 26 are switched by a PWM gate signal output by a PWM forward IC 48 which is controlled by output voltage and the output current from the second current sensor 38 and by a synchronizing signal Sync_FWD 58 output by the GAL 24 and an enable signal FWD_Ena 60 also output by the GAL 24. The DC/DC converter switches 26 operate at a fixed switching frequency of 200 KHz. The PWM Forward IC 48 performs peak current mode control using pulse-by-pulse current limiting to regulate the peak output inductor current. The output current is sensed by the second current sensor 38 and the output voltage of the current sensor is added to a compensating ramp to eliminate variation in average output inductor current due to changes in the duty cycle. The PMW Forward IC 48 is disabled when the GAL 24 applies a high-level signal to the FWA_Ena 40.

The fly-back converter 28 is switched by a PWM Flyback IC 62 which outputs a PWM signal that is fed directly to the fly-back converter 28. The fly-back converter 28 serves as an auxiliary power supply to provide power to all the ICs and control and monitoring circuits. The fly-back converter 28 uses energy from the bulk capacitors 30 to supply three outputs, a +6.5 V primary output, a +12 V primary output and a +12 V secondary output.

Figure 2:
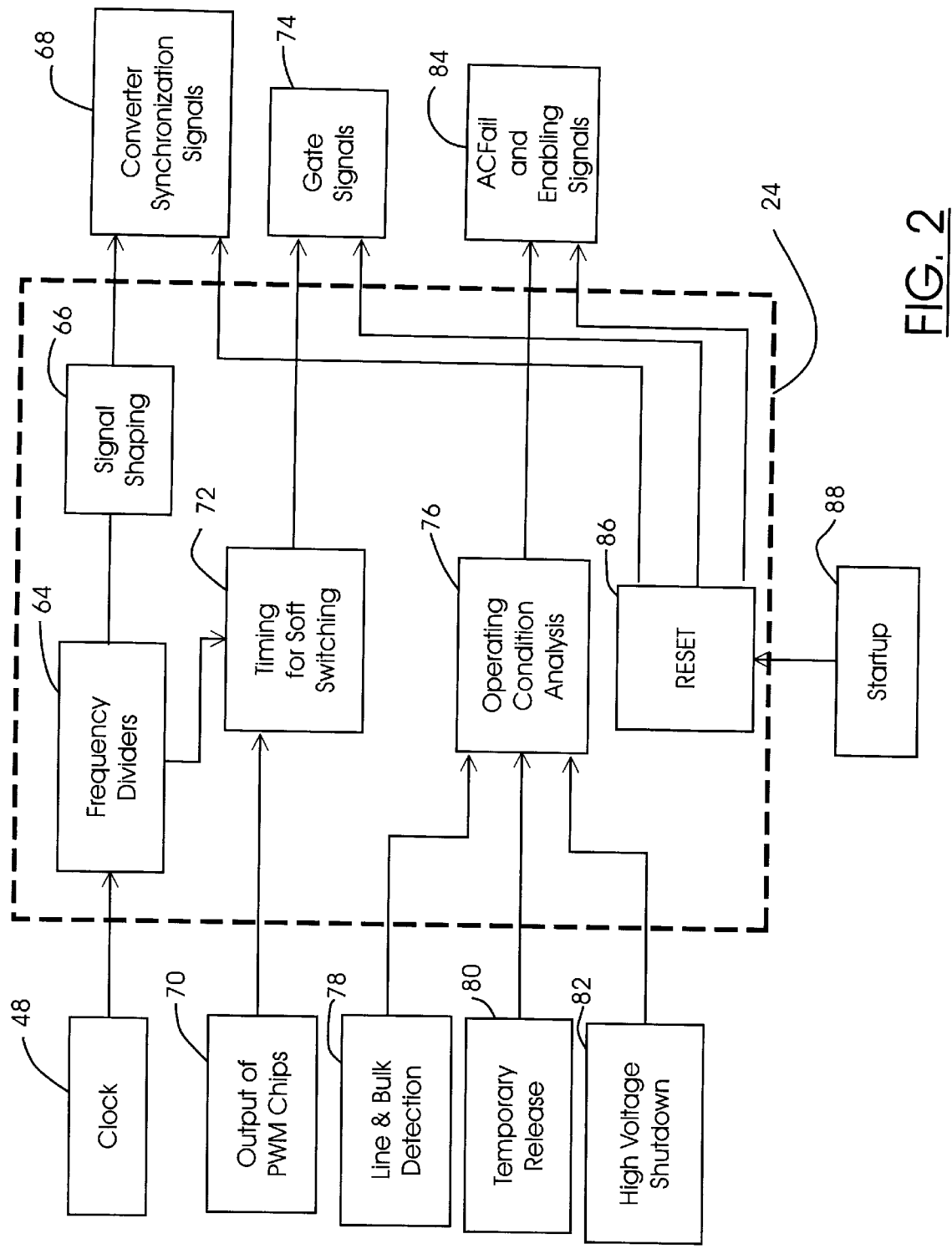
FIG. 2 is a schematic block diagram of the gate array logic IC and the principal inputs to and outputs from the gate array logic IC.

FIG. 2 shows a block diagram of the GAL 24 and its principal inputs and outputs. As explained above, the clock 48 preferably operates at a frequency of 6.4 MHz. The clock output is used as a clock for the GAL 24 and is also used as a data input to pin 31 of the GAL 24 where it is passed through a series of synchronous dividers which divide the current frequency a desired number of times to produce an appropriate timing signal. Preferably, the 6.4 MHz clock signal is synchronously divided five times to produce a timing signal that is 1/64 of the total period resolution. The GAL 24 therefore is enabled to function as at least one virtual monostable that generates digital timing signals resulting from the synchronous division of the clock. By using synchronous division of the 6.4 MHz clock signal, an extremely accurate timing signal is produced which permits precise control of the PWM timing for soft switching 72 and converter synchronization signals 68. While considerable logic is required to realize the virtual monostables enabled by the GAL 24, the GAL 24 has an adequate number of logic gates to permit the synchronous division of the clock inputs. This represents a significant advance in power supply control. The synchronous division is accomplished using frequency dividers 64. Output of the frequency dividers is shaped by signal shaper 66 and output to a converter synchronization signal circuit 68. To synchronize the fly-back converter 28 (see FIG. 1), a 312.5 nanosecond pulse is required. To synchronize the PFC 22 and the DC/DC converter switches 26, a 78.125 nanosecond pulse is required. The PFC 22 and the fly-back converter 28 synchronization signals are timed so that the fly-back converter 28 operates exactly at a frequency four times less than the frequency of the PFC 22 to ensure that they do not interfere with each other. The synchronization pulse for the DC/DC converter switches 26 are generated so that the PFC 22 diodes conduct as much as possible while the DC/DC converter switches 26 are ON to decrease the current in the bulk capacitors 30 between the two converters. The frequency of the DC/DC converter switches 26 is exactly one half of the frequency of the PFC 22.

The operation of the PFC 22 requires extremely accurate control of the transistors to ensure that soft switching is attained. Only accurate control of the PWM and synchronization of the three converters permit this topology to operate efficiently and robustly. While such control and synchronization requires complex circuitry, the GAL 24 provides an adequate number of logic gates to permit the degree of control required. The output of the PWM ICs 46 and 48 (see FIG. 1) indicated by reference 70 is input to the GAL 24 which uses frequencies generated by the frequency dividers 64 to condition the PWM timing for soft switching. The conditioned signals are output as gate signals 74 to the PFC 22 and the DC/DC converter switches 26. The PWM Forward IC 48 must operate at a maximum duty cycle of 50% to control that converter. If a throttled PWM IC is used, there is a noise problem because commercially available throttled PWM ICs incorporate a D flip flop which operates with the output of !Q connected at the D input to change the output state at each pulse of the clock. This type of throttling is called asynchronous frequency division. It generates a noise at the clock pin which can generate two inverter signals on any given clock cycle. In order to overcome this problem, PWM throttling is shifted to the GAL 24 and an unthrottled PWM IC is used. This permits the use of a more robust PWM IC, while ensuring substantially noise-free control of the PWM duty cycle. Furthermore, commercially available PWM ICs that are duty cycle throttled do not reach a 50% duty cycle in operation. However, the GAL 24 permits a full 50% duty cycle to be attained under any operating condition. This means that the primary side of the forward converter can be optimized.

The other principal function of the GAL 24 is operating condition analysis which is conducted by an operating condition analysis routine 76 that receives line and bulk detection inputs 78 from the line detection sensor 20 and the bulk detection sensor 32 (see FIG. 1). Inputs are also received as a temporary release (TR) signal 80 and a high-voltage shutdown (HVSD) signal 82. The operating condition analysis routine 76 analyzes these inputs and outputs enabling signals PFC_Ena 56 and FWD_Ena 60 (see FIG. 1) which are input to the PWM boost IC 46 and the PWM Forward IC 48, respectively. When the PWM Ics are reset they generate a soft start of the PFC 22 and the forward converter. The GAL 24 also outputs an AC fail alarm when the line detection sensor 20 senses that the AC current on the input line 12 is interrupted.

A reset routine 86 receives inputs from a start-up circuit 88. The start-up circuit 88 initiates a reset of all devices when the supply voltage reaches 4.5 V. At that point, the start-up circuit 88 sends a signal to the GAL 24 indicating that start-up has occurred. The PFC 22 and the DC/DC converter switches 26 are disabled during the start-up of the fly-back converter 26.

The PFC 22 and or the DC/DC converter switches 26 must be disabled when certain problems are detected on the line, the load, the PFC 22, when a Temporary Release (TR) 80 is generated by the controller or a High Voltage Shutdown (HVSD) condition occurs. Table I lists the potential problems that may occur and the actions which are taken with respect to each converter for each specific problem:

TABLE I

|  | Power Factor Corrector | DC/DC Converter |
| --- | --- | --- |
| Low Line | disable | enable |
| High Line | disable | disable |
| Low Bulk | enable | disable |
| High Bulk | disable | disable |
| TR | disable | disable |
| HVSD | enable | disable |

The high-line and low-line alarms respectively detect when the input voltage is outside the limits for which the power supply was designed. Those alarms generate a AC fail alarm to the controller and preferably turn on a red LED to indicate a fail condition. The high-bulk and low-bulk indicate a problem at the PFC 22. The HVSD indicates a problem on the load.

The preferred embodiment of the controller as described above is intended to be exemplary only. Changes and modifications to the described embodiment may be apparent to those skilled in the art. The scope of the invention is therefore intended to be limited solely by the scope of the appended claims.

I claim:

1. A soft switched PWM AC to DC converter, comprising:
   a power factor corrector converter with a boost topology that operates at a first fixed frequency;
   a DC/DC converter with a forward topology that operates at a second fixed frequency;
   a clock that operates at a fixed frequency that is greater than the frequency of the first fixed frequency and the second fixed frequency; and
   a gate array logic IC for timing and synchronizing PWM signals for the power factor corrector converter and the DC/DC converter using the clock signal, whereby the clock signal is divided "n" times in the gate array logic IC using a synchronous divider to provide virtual monostable output signals for use in converter synchronization and gate signal timing.

2. A soft switched PWM AC to DC converter as claimed in claim 1 wherein the gate array logic IC further analyses converter operating conditions and outputs enable signals to ICs for generating the PWMs to enable or disable the power factor corrector converter and the DC/DC converter in response to changing operating conditions.

3. A soft switched PWM AC to DC converter as claimed in claim 2 wherein the operating conditions analyzed include line voltage, line bulk, temporary release and high voltage shutdown.

4. A soft switched PWM AC to DC converter as claimed in claim 1 wherein the gate array logic IC further outputs converter synchronizing signals to synchronize the operation of a fly-back converter with operation of the power factor corrector converter and the DC/DC converter.

5. A soft switched PWM AC to DC converter as claimed in claim 1 wherein a PWM for the DC/DC converter is duty cycle throttled by the gate array logic IC to minimize noise at an output pin of an IC that generates the PWM and ensure that spurious PWM signals are not generated as a result of the noise.

6. A soft switched PWM AC to DC converter as claimed in claim 5 wherein the PWM is duty cycle throttled to a maximum duty cycle of 50%.

7. A method of controlling the operation of a soft switched PWM AC to DC converter to produce a high quality DC output, comprising:
   a) operating a clock at a frequency of $2^n$ KHz, where n is an integer greater than 2, to produce a clock signal;
   b) inputting the clock signal as data on an input pin of a gate array logic IC;
   c) repeatedly synchronously dividing the clock frequency to produce at least one digital monostable timing signal; and
   d) using the at least one monostable timing signal to time the PWM for the converter and to synchronize converter operations to maximize efficiency and minimize EMI noise.

8. A method of controlling the operation of a soft switched PWM AC to DC converter as claimed in claim 7 wherein n=5 and the clock signal is synchronously divided 5 times to provide a digital monostable timing signal with 1/64 of the total period resolution.

9. A method of controlling the operation of a soft switched PWM AC to DC converter as claimed in claim 7 wherein the converter includes a power factor corrector converter, a DC/DC converter and a fly-back converter and the operation of each converter is synchronized using at least one monostable timing signal to minimize noise and maximize efficiency.

10. A method of controlling the operation of a soft switched PWM AC to DC converter as claimed in claim 9 wherein the power factor corrector converter and the DC/DC converter operate at twice the frequency of the fly-back converter.

11. A method of controlling the operation of a soft switched PWM AC to DC converter as claimed in claim 9 wherein a synchronization signal for the fly-back converter and the power factor corrector converter are generated simultaneously to ensure that the operation of one does not affect the operation of the other.

12. A method of controlling the operation of a soft switched PWM AC to DC converter as claimed in claim 11 wherein a synchronization pulse for the DC/DC converter is generated so that diodes in the power factor corrector converter conduct as much as possible while the transistors in the DC/DC converter are ON in order to decrease the current in bulk capacitors located between the two converters.

* * * * *